(12) United States Patent
Venkob et al.

(10) Patent No.: US 8,200,199 B2
(45) Date of Patent: Jun. 12, 2012

(54) METHOD AND APPARATUS FOR CUSTOMIZING A DELIVERY STATUS NOTIFICATION

(75) Inventors: Satish Venkob, Waterloo (CA);
Roopashri Satish, Waterloo (CA)

(73) Assignee: Research In Motion Limited, Waterloo, ON ( * ) Notice: Subject to any disclaimer, the term of this patent is extended or adjusted under 35 U.S.C. 154(b) by 588 days.

(21) Appl. No.: 12/275,829

(22) Filed: Nov. 21, 2008

(65) Prior Publication Data
US 2010/0130174 A1    May 27, 2010

(51) Int. Cl.
*H04M 1/725* (2006.01)

(52) U.S. Cl. .................. 455/412.2; 455/412.1; 455/466; 455/552.1

(58) Field of Classification Search .................. 455/412, 455/413, 466, 412.1, 412.2, 552.1
See application file for complete search history.

(56) References Cited

U.S. PATENT DOCUMENTS

| | | | |
|---|---|---|---|
| 6,085,068 A | 7/2000 | Eaton et al. | |
| 6,618,749 B1 | 9/2003 | Saito et al. | |
| 6,782,414 B1 | 8/2004 | Xue et al. | |
| 6,944,271 B2 | 9/2005 | Yakura et al. | |
| 6,954,136 B2 | 10/2005 | Sauer | |
| 7,043,530 B2 | 5/2006 | Isaacs et al. | |
| 7,142,676 B1 | 11/2006 | Hillier et al. | |
| 2002/0026483 A1 | 2/2002 | Isaacs et al. | |
| 2002/0069248 A1 | 6/2002 | King et al. | |
| 2003/0061176 A1 | 3/2003 | Hoar | |
| 2005/0066005 A1 | 3/2005 | Paul | |
| 2007/0106737 A1 | 5/2007 | Barnes et al. | |
| 2007/0260694 A1 | 11/2007 | Boss et al. | |

FOREIGN PATENT DOCUMENTS

| | | |
|---|---|---|
| EP | 1924066 A | 5/2008 |
| WO | 2007033471 A | 3/2007 |

OTHER PUBLICATIONS

European Patent Application No. 08169728 Search Report mail date Apr. 24, 2009.

*Primary Examiner* — Temica M Beamer
(74) *Attorney, Agent, or Firm* — Perry + Currier

(57) ABSTRACT

A method for customizing a delivery status notification from a recipient to a sender, comprising associating at least one sender device with a notification message; and upon receipt of a message from the sender device delivering the message to a recipient device and returning the notification message to the sender device.

16 Claims, 6 Drawing Sheets

METHOD AND APPARATUS FOR CUSTOMIZING A DELIVERY STATUS NOTIFICATION

GENERAL

The present specification relates generally to electronic communication devices and in particular to a method and apparatus for customizing a delivery status notification from a recipient to a sender.

FIELD

The use of simplex messaging such as email, SMS (text), MMS, etc. is widespread, with most computers and handheld electronic devices having at least one such messaging application installed to allow a sender to compose and send a message to a desired recipient or group of recipients. It is also known to provide a delivery receipt that is sent to the sender responsive to the recipient receiving the message (i.e., the recipient device has received the message) or a read receipt responsive to the recipient reading the message, or both.

Prior art relevant to the foregoing includes: U.S. Pat. No. 7,142,676, U.S. Pat. No. 6,954,136, U.S. Pat. No. 6,944,271, U.S. Pat. No. 6,782,414, U.S. Pat. No. 6,618,749, U.S. Pat. No. 7,043,530, U.S. Pat. No. 6,085,068, US20070106737, US20030061176, US20020069248 and US20020026483.

It would be desirable to provide a mechanism for a message recipient to customize the notification sent to the message sender for indicating status of the message (e.g. message read, message received, etc.). For example, if the message sender is Greg, the notification from the recipient could be personalized for Greg (e.g. "I received your email, Greg. I am busy with X, but will get back to you within 24 hours"). It would also be desirable to incorporate media content such as music, video, etc. in the customized response.

BRIEF DESCRIPTION OF THE DRAWINGS

The embodiments will be better understood with reference to the following Figures in which like numerals denote like parts and in which.

DESCRIPTION OF PREFERRED EMBODIMENTS

In general, a method and apparatus are set forth for customizing a delivery status notification from a recipient to a sender.

According to one aspect of this specification, there is provided a method of customizing a delivery status notification from a recipient to a sender, comprising: associating at least one sender device and recipient device with a notification message; upon receipt of a mail message from said sender device delivering said mail message to said recipient device and returning said notification message to said sender device.

According to another aspect, there is provided a computer readable medium containing computer-executable instructions that, when performed by a processor, causes said processor to implement a method of customizing a delivery status notification from a recipient to a sender, comprising: associating at least one sender device and recipient device with a notification message; upon receipt of a mail message from said sender device delivering said mail message to said recipient device and returning said notification message to said sender device.

According to yet another aspect, there is provided a system for customizing a delivery status notification from a recipient device to a sender device, comprising: a messaging infrastructure for delivering said mail message from said sender device to said recipient device, associating said sender device and recipient device with a message payload to said delivery status notification for customizing said delivery status notification returned by said messaging infrastructure to said sender device, and returning said delivery status notification to said sender device; and a content provider for generating specific content within said message payload.

Figure 1:
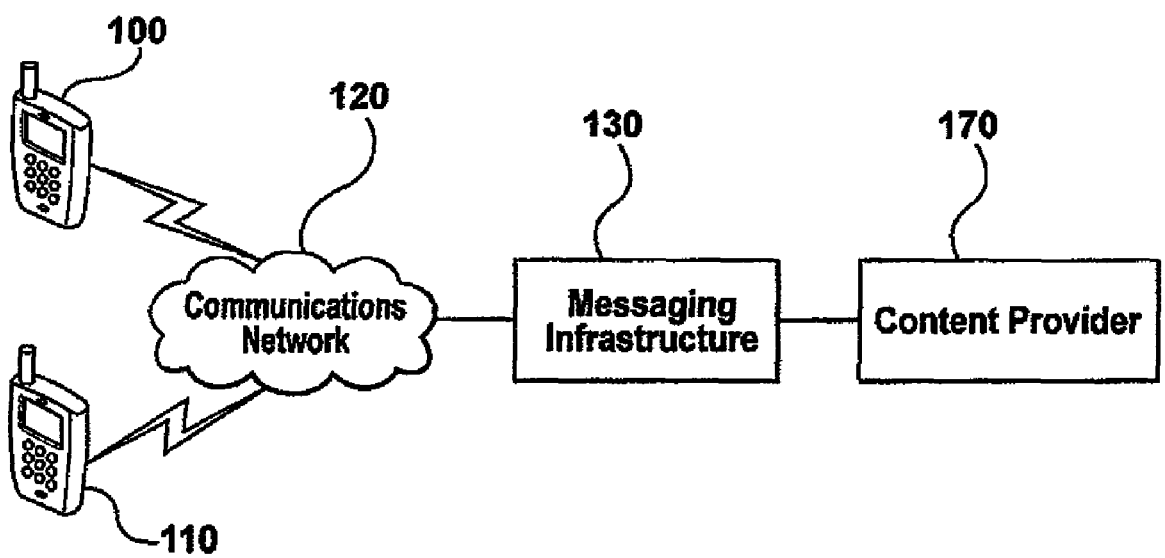
FIG. 1 is a simplified block diagram of a system for customizing a delivery status notification from a recipient handheld electronic device to a sender handheld electronic device, according to a non-limiting embodiment.

FIG. 1 depicts a system for customizing a delivery status notification from a recipient device 110 to a sender device 100, according to a non-limiting embodiment. The devices 100 and 110 are preferably handheld electronic devices that communicate over a communications network 120. In one aspect, the devices 100 and 110 enable voice communication over the network 120, while in another aspect messages (e.g. email, MMS, etc.) may be exchanged via the network 120 under control of a messaging infrastructure 130. The preferred electronic device comprises one of a cell phone, a personal digital assistant (PDA), a WiFi-based communications device, a WiMax based communications device, or a combination thereof.

Figure 2:
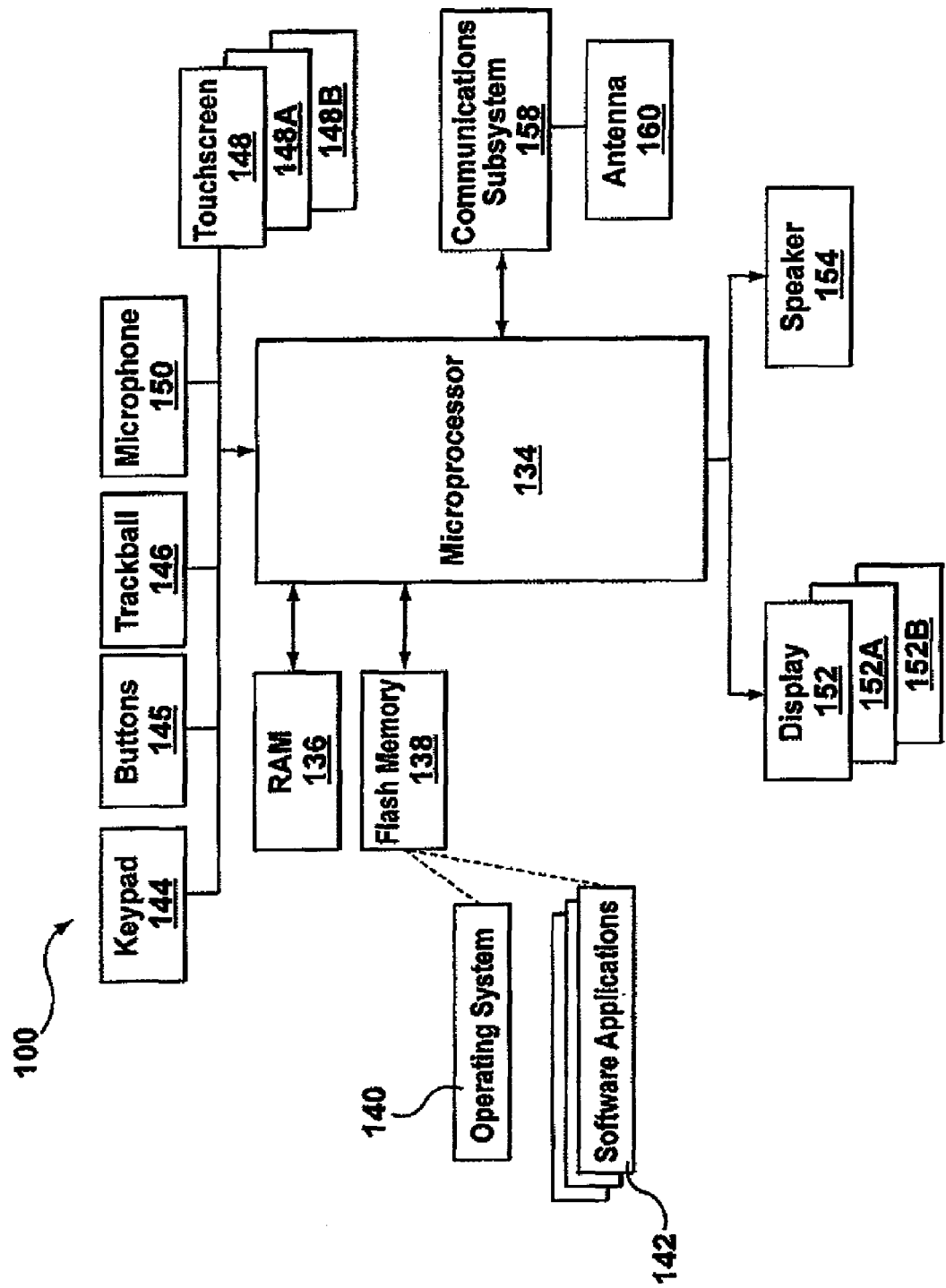
FIG. 2 is a block diagram showing functional components of an exemplary handheld electronic device depicted in FIG. 1.

Referring briefly to FIG. 2, a block diagram is provided of certain components, including internal components, within an exemplary handheld device 100 or 110 of FIG. 1, including a microprocessor 134 connected to a random access memory (RAM) 136 and a persistent storage device, which in the illustrated embodiment is a flash memory 138. Flash memory 138 is responsible for various non-volatile storage functions of the mobile communication device 100, such as operating system software 140, executable by the microprocessor 134. It will be appreciated, however, that the operating system software 140 can be stored in other types of memory such as read-only memory (ROM). In the illustrated embodiment, software applications 142 are stored in the persistent storage device 138 for execution by the microprocessor 134 to carry out various functions, as is known in the art. The microprocessor 134 receives input from various input devices including a keypad 144, a trackball 146, at least one touch screen 148, 148A, 148B, etc., and a microphone 150. The microprocessor 134 outputs to various output devices including at least one display 152, 152A, 152B, etc., such as an LCD display and a speaker 154. Other input devices (e.g. SEND and END keys, navigation keys or buttons, etc.) and output devices (e.g. LED message lamps, etc.) may also be provided. In some embodiments, the touch screen 148, 148A, 148B, etc., may be disposed so as to overlay the displays 152, 152A, 152B, etc.

The mobile device 100 may send and receive communication signals over the network 120 after required network registration or activation procedures have been completed. Network access is associated with a subscriber or user of the mobile device via a SIM/RUIM card (i.e. Subscriber Identity Module or a Removable User Identity Module) within the communication subsystem 158. The SIM card (not shown) or RUIM is one type of a conventional "smart card" that can be used to identify a subscriber of the mobile device and to personalize the mobile device, among other things.

In a data communication mode, a received signal such as an email message or Web page is processed by the communications subsystem 158 and input to the microprocessor 134 for further processing and output to the displays 152, 152A, 152B, etc. A user of the mobile communication device 100 can also compose data items within a software application, such as a messaging application, using the keypad 144 and/or touch screen 148, 148A, 148B, etc., in conjunction with display 152, 152A, 152B, etc. Such composed items can then be transmitted over the communications network through the communications subsystem 158 and antenna 160.

For voice communications, the overall operation of the mobile device 100 is substantially similar, except that the received signals are output to the speaker 154, and signals for transmission are generated by the microphone 150. Alternative voice or audio I/O subsystems, such as a voice message recording subsystem, can also be implemented on the mobile device. Although voice or audio signal output is accomplished primarily through the speaker 154, the display 152, 152A, etc. can also be used to provide additional information such as the identity of a calling party, duration of a voice call, or other voice call related information.

As indicated above, the flash memory 138 stores a plurality of applications 142 executable by the microprocessor 134, such as a message application for allowing a user to send and receive electronic messages (email), an attachment content handling application, which operates in conjunction with the message application to provide the user with attachment content handling options for messages that have an associated attachment. The attachment may be a document converted to plain text, an audio file compressed to WAV or an image file, for example. Once the user selects an attachment document for viewing according to a preferred attachment content handling option, the attachment content handling application generates a request for an attachment server (not shown) to download the transcoded/compressed attachment, which can thereafter be viewed/played using an attachment viewer application.

In the embodiment of FIGS. 1 and 2, the devices 100 and 110 are based on the computing environment and functionality of a wireless personal digital assistant (PDA). It will be understood, however, that devices 100 and 110 are not limited to wireless personal digital assistants. Other mobile devices are possible, such as Personal Digital Assistants, smart telephones, portable entertainment devices, etc. Also, in some embodiments, the electronic devices 100 and 110 may comprise laptop or desktop computers.

In some embodiments, the devices 100 and 110 may be enabled to communicate via wireless network 120, while in other embodiments, the electronic devices may be enabled to communicate via a wired network. In yet other embodiments, the electronic devices may be enabled to communicate via either a wireless or a wired network. In some embodiments the handheld electronic devices are enabled to communicate with the communications network 120, via other local computing devices, which in turn are in communication with the communications network 120. In these embodiments, the electronic devices may be enabled to communicate with the local computing devices via a wired or a wireless link (e.g. WiFi, Bluetooth, and/or a hardwired serial bypass, such as a USB link).

In some embodiments the communications network 120 may comprise at least one of a local area network (LAN), a wide area network (WAN), a wireless network, a packet-based communications network, such as the internet, and/or the PSTN, a cell network, a WiFi network, a WiMax network, or a combination thereof.

Returning briefly to FIG. 1, electronic messages may be communicated between devices, such as handheld electronic devices 100 and 110, via messaging infrastructure 130 in a manner that is well known in the art. The messaging infrastructure 130 may, in turn, communicate with a content provider 170 (e.g. a media server) for customizing delivery status notifications, as discussed in greater detail below.

Figure 3:
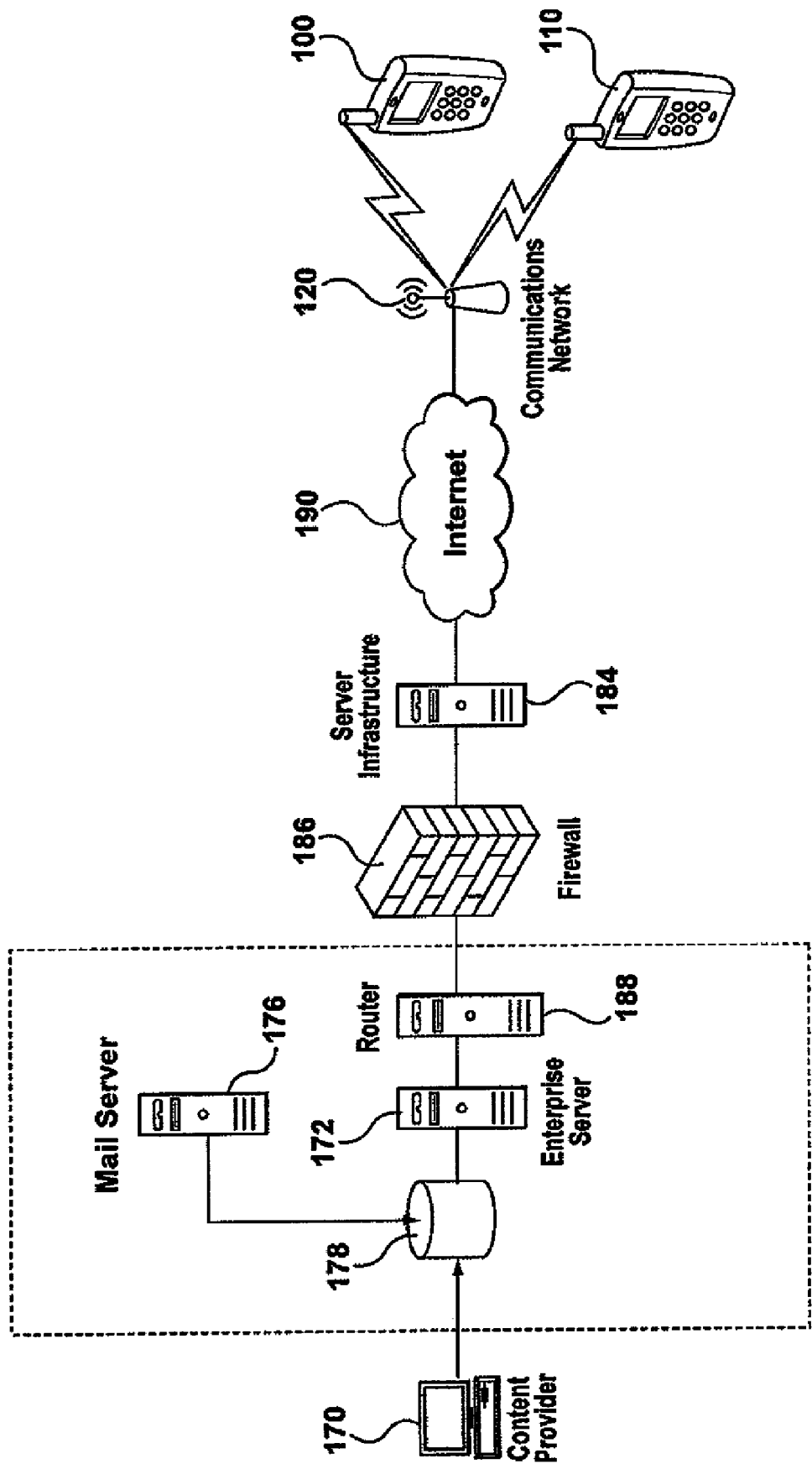
FIG. 3 is a block diagram showing system components of a messaging infrastructure depicted in FIG. 1.

With reference to the embodiment of FIG. 3, the messaging infrastructure 130 may, for example, include an enterprise server 172 and a mail server 176 connected to a message database 178 containing a lookup table, as discussed in greater detail below. An alternative exemplary messaging structure is discussed below in connection with FIG. 6. The servers 172 and 176 preferably include conventional hardware such as processors, memory, interfaces, etc., as would be well understood by a person of ordinary skill in the art. The enterprise server 172 is connected to a server infrastructure 184, through firewall 186, via a router 188. The server infrastructure 184 is connected to the Internet 190 which, in turn, communicates with a plurality of hand-held devices, such as devices 100 and 110. A person of skill in the art will appreciate that the configuration of FIG. 3 is exemplary, only, and that numerous other configurations are possible. For example, although content provider 170 is illustrated as being a server that is separate from the message infrastructure 130, it is possible to incorporate the functionality of content provider 170 into the enterprise server 172, as discussed in greater detail below, or in other servers within the infrastructure.

Figure 4:
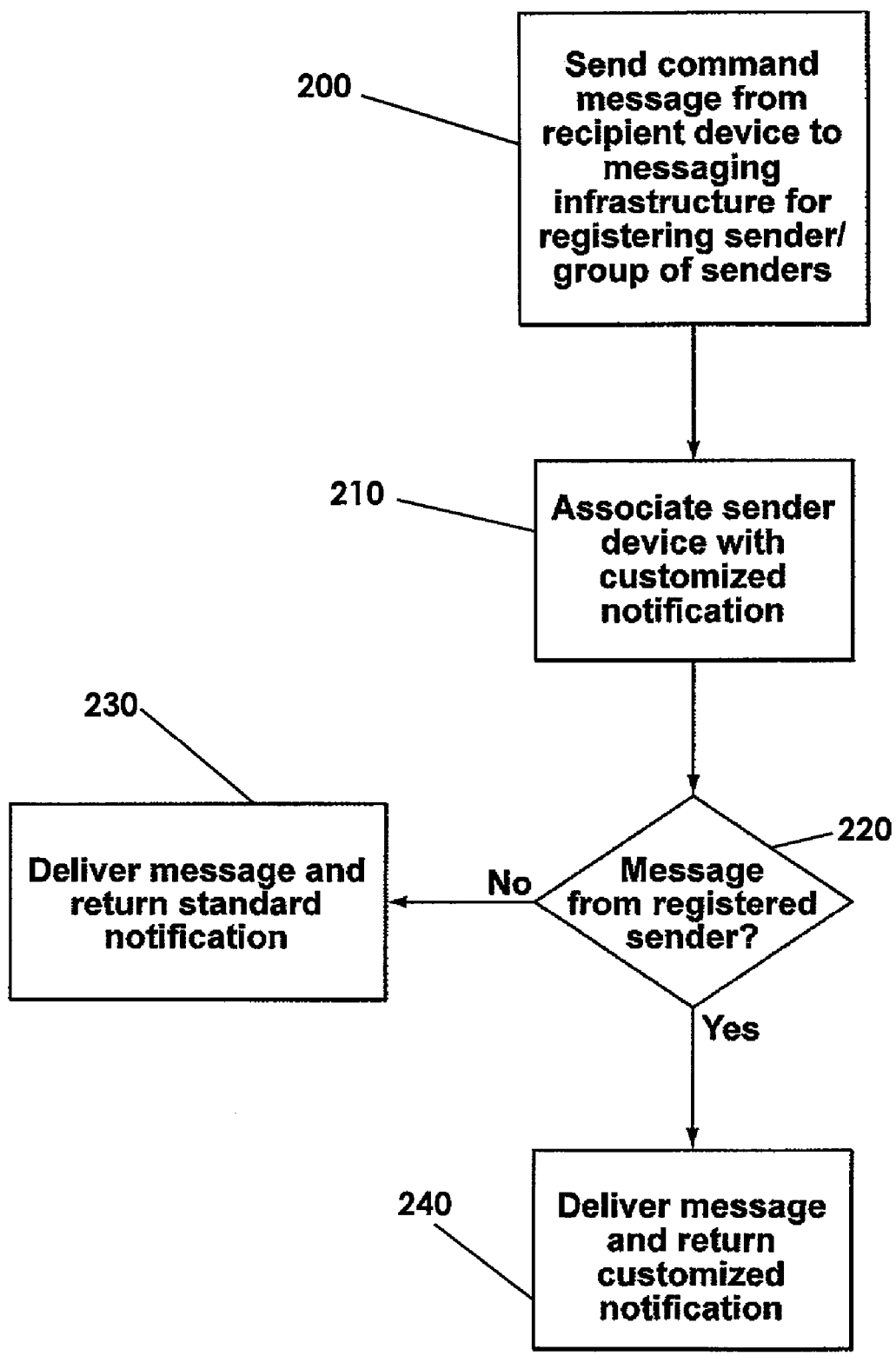
FIG. 4 is a flowchart showing steps in a method for customizing a delivery status notification from a recipient to a sender, according to an exemplary embodiment.

Referring now to FIG. 4, a flow chart is provided showing steps in a method by which the components of FIGS. 1-3 may interact for customizing a delivery status notification from a recipient electronic handheld device 110 to a sender electronic handheld device 100, according to a non-limiting embodiment.

Figure 5:
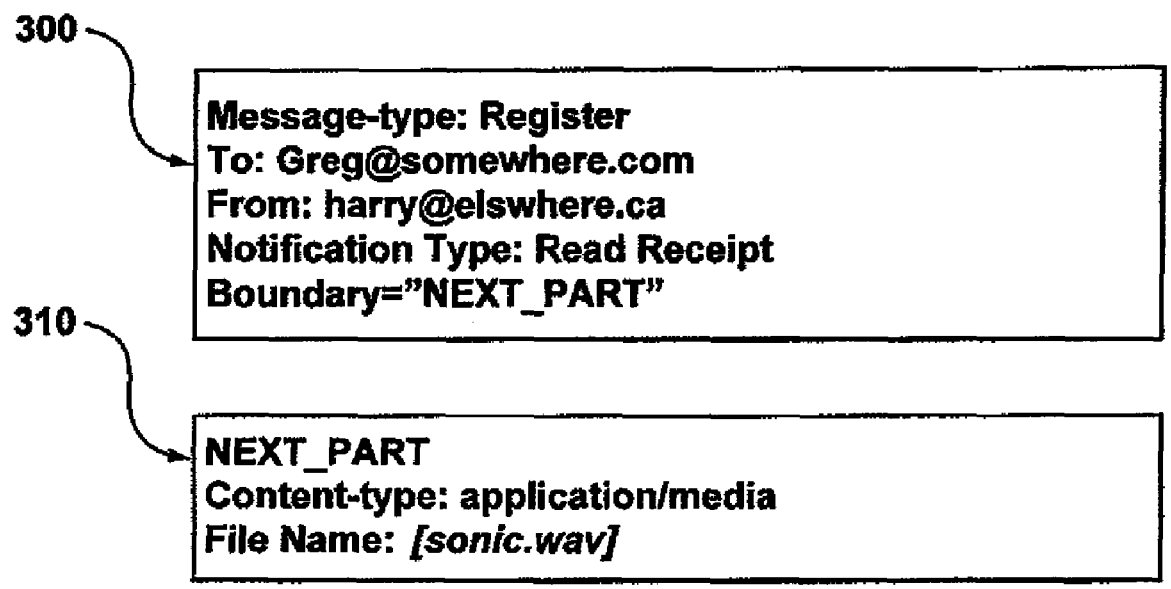
FIG. 5 is a representation of an exemplary command message for associating a sender and recipient for customized delivery status notification, according to a non-limiting embodiment.

At step 200, device 110 sends a first command message to messaging infrastructure 130 for registering a specific sender or group of senders with specific content (e.g. customized text message, media (audio, video, etc.)) to be sent or played to the sender (or group of senders) as a delivery status notification (e.g. successful delivery of an email message, unsuccessful delivery of an email message, read receipt of an email message, etc.). An exemplary message is shown in FIG. 5, wherein the format of the first part 300 of the message includes the following fields: "Message Type", "From", "To" and "Notification Type", followed by a "Payload" portion 310.

The "Message Type" can, for example, be Register (with new payload), Deregister, Activate (activate service with payload for a specific notification type) or Deactivate (deactivate service with payload for a specific notification type). The "From" field identifies the recipient user's address. This is typically an email address, but can also, for example, be an IP address. The "To" field indicates the address or addresses of users or groups of users to whom personalized mail notification(s) is/are to be delivered. This also can be in the form of email addresses or IP addresses. "Notification Type" specifies the trigger for playing out the notification (e.g. upon successful delivery, in the event of unsuccessful delivery, read receipt, etc.) The "Payload" 310 can be a file/URL retrieved from the content provider 170.

At step 210, upon receipt of the first command message, enterprise server 172 associates each sender with a specific customized notification response. In particular, enterprise server 172 stores the payload to be used as delivery notification in a lookup table within database 178 that is indexed by <FromUser,ToUser> address pairs. Alternatively, rather than store the actual media file payload, the lookup table can store an address e.g. (IP address/URL) within the content provider 170 against the <FromUser ToUser> index, from which it can retrieve the payload using one of either a proprietary or a standard protocol (e.g. HTTP, SOAP, etc).

Next, upon receipt of an email message from a sender (e.g. Greg, as in the example of FIG. 5), the messaging infrastructure 130 determines whether or not the message has been sent from a registered sender device 100 of the recipient (step 220). Specifically, server 172 parses the email message to identify the <FromUser ToUser> fields and compares the fields to the index pairs in the lookup table within database 178.

In the event that the sender has not been registered with the recipient according to the lookup table (i.e. a "No" at step 220), then the email is delivered in the conventional manner and a default notification (i.e. a check mark or an 'x') is sent from enterprise server 172 etc. within the messaging infrastructure 130 to the sending device 100 (step 230).

On the other hand, if the sender has been registered by the recipient in the lookup table, then the messaging infrastructure forwards the message to the recipient device 110, and enterprise server 172 generates a notification with the customized payload (e.g. customized text, or media retrieved from the content provider 170) and returns the notification (step 240) to the sender device 100. According to one aspect, the type of personalized notification may depend on "Notification Type" (e.g. Delivery notification, unsuccessful delivery or read receipt as defined in the register command).

The customized notification may include one or more of a small media file (e.g. music, video, image, etc.) or text (e.g. SMS, etc.) associated within the content provider 170 with the specific sender, or may include an IP address or URL within the content provider 170 indexed against the <FromUser ToUser> index, from which the device 100 can retrieve the payload, as discussed in greater detail below.

In order to stream media files (video/voice), two options are contemplated. In one option, the file is delivered to the sender using a standard protocol and an application on the device of the sender then locally plays the media file. According to another option, the enterprise server 172 streams the media to the sender's device using a proprietary streaming protocol.

A person of ordinary skill in the art will understand that modifications and enhancements may be made to the exemplary notification system disclosed herein. For example, in order to provide for sender's privacy it is contemplated that the content from provider 170 only be played/displayed at sender device 100 if it complies with privacy settings configured for the device 100 (which may be registered by the sender either with the messaging infrastructure 130 or content provider 170).

According to an alternative embodiment, the function of content provider 170 may be provided by an application running within the enterprise server 172 in FIG. 3. For example, at step 200 of FIG. 4, device 110 sends the first command message to enterprise server 172 for registering a specific sender or group of senders with specific content (e.g. a custom URL in the "Payload" 310), as provided at step 210.

Next, upon receipt of an email message from a sender (e.g. Greg, as in the example of FIG. 5), the messaging infrastructure 130 sends a further message to the enterprise server 172 which, in response, determines whether or not the message has been sent from a registered sender device 100 of the recipient (step 220). Playing of the notification/fetching information from the URL is then done by the sender device 100 using a standard protocol such as HTTP (i.e. for pictures) or other conventional streaming protocol (i.e. for video/audio files).

It will be appreciated that the foregoing alternative embodiment has minimal impact on messaging infrastructure 130 since there is no need for special communication between enterprise server 172 and content server 170 (i.e. the functionality of "pulling" the notification is performed by the sender device 100 and there is no requirement to "push" content to the sender device 100 through the messaging infrastructure).

According to a modification of the aforementioned alternative embodiment, device 110 does not pre-register the URL but instead sends the URL as part of its acknowledgement to the server 172 using conventional protocols defined between the device and the server 172.

According to a further modification of the aforementioned alternative embodiment, rather than implementing the content provider function within a separate server 170 or within enterprise server 172, the function of the content provider may be provided by an attachment server (not shown) within the messaging infrastructure 130.

Figure 6:
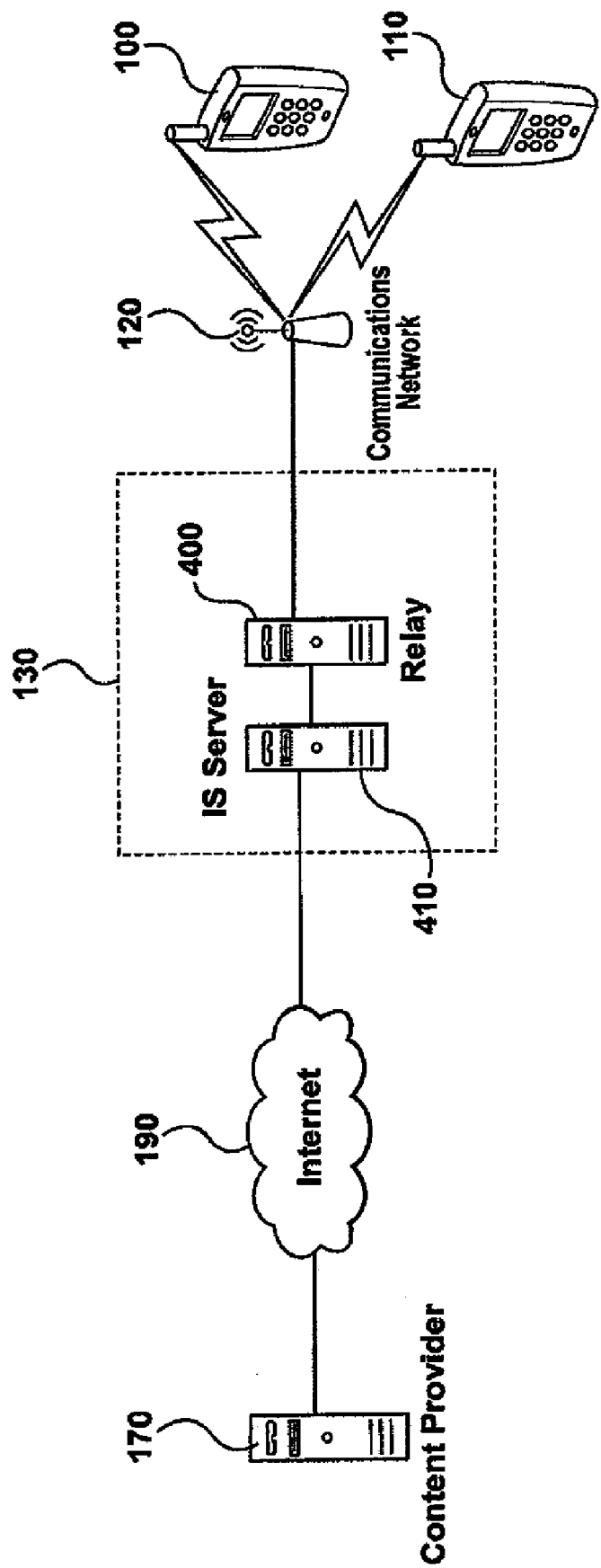
FIG. 6 is a block diagram showing system components of a messaging infrastructure depicted in FIG. 1, according to an alternative embodiment.

According to the embodiment of FIG. 6, messaging infrastructure 130 comprises a relay 400 and an Internet Service (IS) server 410, and content provider 170 is a public web server accessible to the IS server 140 via the internet 190. In this embodiment, the lookup table and association functionality are provided by the IS server 410.

According to yet another embodiment, the <FromUser, ToUser> index can be a unique device PIN for each of the sender device 100 and recipient device 110, rather than email address pairs.

According to additional embodiments and variations of the foregoing, upon receipt of the notification message, media content can be pulled by the sender device 100 from the server 172 (or server 410, or content provider 170), or pushed to the device 100 upon receipt of a subsequent media request message from the sender device. In any of the foregoing embodiments, the customized media can either be streamed to the device 100 or sent as a media file that is then automatically played via a media application on the device 100.

Also, the media content provided by content provider 170 is not particularly limited. For example, it is contemplated that the media content for a customized notification message may include advertising or other content.

Specific embodiments have been shown and described herein. However, modifications and variations may occur to those skilled in the art. For example, as discussed above, although the exemplary embodiment has been described in terms of implementation on a portable handheld electronic device, the principles set forth herein may be applied to other devices such as desktop computers, etc. All such modifications and variations are believed to be within the sphere and scope of the present embodiment.

The invention claimed is:

1. A method of customizing a delivery status notification from a recipient to a sender, comprising:

associating at least one sender device and recipient device with a notification message, wherein said associating further comprises receiving a command message from said recipient device for registering said at least one sender device with specific content associated with said delivery status notification, wherein said command message is generated at said recipient device;

upon receipt of a mail message from said sender device delivering said mail message to said recipient device and returning said notification message to said sender device.

2. A method as claimed in claim 1, wherein said associating further comprises associating addresses of said sender device and recipient device and a defined notification type with said notification message.

3. A method as claimed in claim 2, wherein said notification message includes a payload comprising at least one of a text message, a URL and a media file.

4. A method as claimed in claim 3, wherein said associating further comprises generating a lookup table for associating said notification message with said addresses of said sender device and recipient device and defined notification type.

5. A method as claimed in claim 4, wherein said associating of said notification message comprises storing one of either said at least one of said text message and media file or an address of said at least one of said text message and media file.

6. A system for customizing a delivery status notification from a recipient device to a sender device, comprising:

a messaging infrastructure for delivering said mail message from said sender device to said recipient device, associating said sender device and recipient device with a message payload to said delivery status notification for customizing said delivery status notification returned by said messaging infrastructure to said sender device, wherein said associating further comprises receiving a command message from said recipient device at said messaging infrastructure for registering said sender device with specific content associated with said delivery status notification, and returning said delivery status notification to said sender device, wherein said command message is generated at said recipient device; and a content provider for generating said specific content within said message payload.

7. The system of claim 6, wherein said command message includes a first portion having a Message Type field, a From field, a To field and a Notification Type field, followed by a "Payload" portion.

8. The system of claim 7, wherein said Message Type field includes at least one of a Register command, a Deregister command, an Activate command for activating the status notification for a specific notification type and a Deactivate command for deactivating the status notification for a specific notification type.

9. The system of claim 7, wherein said From field identifies an address for said recipient device and said To field includes an address for said sender device.

10. The system of claim 9, wherein each said address is one of either an email address or an IP address.

11. The system of claim 7, wherein said Notification Type field specifies a trigger for returning said delivery status notification.

12. The system of claim 11, wherein said trigger comprises one of successful mail message delivery, unsuccessful mail message delivery and mail message read receipt.

13. The system of claim 9 wherein said content provider further comprises a lookup table for associating said notification message with said addresses of said sender device and recipient device.

14. A computer readable medium containing computer-executable instructions that, when performed by a processor, causes said processor to implement a method of customizing a delivery status notification from a recipient to a sender, comprising:

associating at least one sender device and recipient device with a notification message, wherein said associating further comprises said recipient device sending a command message to said messaging infrastructure for registering said sender device with specific content associated with said delivery status notification, wherein said command message is generated at said recipient device;

upon receipt of a mail message from said sender device delivering said mail message to said recipient device and returning said notification message to said sender device.

15. The system of claim 6, wherein said content provider is integrated within an enterprise server of said messaging infrastructure.

16. The system of claim 6, wherein said message payload includes a URL.

* * * * *